3,533,778
AUTOMATIC CONTROL OF PIG IRON REFINING
Paul Emile Nilles, Embourg, and Etienne Marie Denis, Grivegnee, Belgium, assignors to Centre National de Recherches Metallurgiques, Brussels, Belgium, a Belgian company
Filed Apr. 14, 1967, Ser. No. 630,994
Claims priority, application Luxembourg, Apr. 20, 1966, 50,939
Int. Cl. C21c 5/32
U.S. Cl. 75—60      4 Claims

ABSTRACT OF THE DISCLOSURE

This is a method of controlling a pig iron refining operation by plotting the variation of sound intensity within the converter and the variation of the temperature of the products produced by combustion of the converter gases with time and adjusting the refining conditions so that the two graphs thus obtained follow predetermined paths.

---

Figure 1:
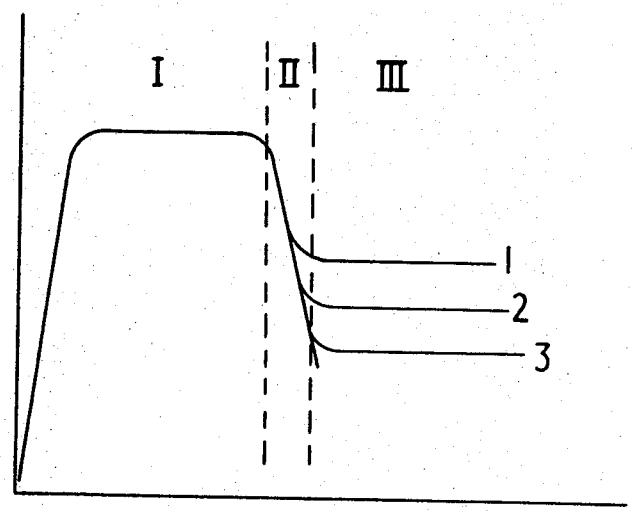

This invention relates to a method of carrying out a pig iron refining operation, for the production of steel automatically. It is applicable to all refining operations in which the oxidising gas is blown from above, onto or into a metallic bath to be refined.

There already exist a number of special methods allowing a certain amount of supervision of pig iron refining processes by following one or other of the characteristic features of this operation.

For example, methods based on the observation of the spectrum of sound coming from the converter or on analyses of the gases issuing from the converter and so on, have been used. From these observations or analyses, by virtue of these methods and by suitable modification of one or other of the refining conditions, it is possible to keep the values observed within limits that must not be exceeded if the refining process is to run smoothly.

Most of these known methods, however, do not permit the refining operation to be carried out effectively, and do not allow effective, continuous and simultaneous control of the decarbonisation of the molten bath and the formation of slag of predetermined composition to be effected, and consequently an accurate distribution of the refining oxygen between slag and molten bath cannot be obtained.

The method of this invention makes it possible to overcome the disadvantages mentioned above, and this method has the double advantage of reducing the content of iron in the slag as well as its dispersion; by this method it is possible to adjust the iron content to a predetermined value for practically the entire refining operation, and as a result to bring the slag to a precisely determined reaction state and keep it in that state.

The method of the invention is based on predetermined knowledge and simultaneous measurement of a portion of the graph of sound level in the converter, caused by the refining operation, against time and the graph giving the temperature of the gaseous products resulting from the combustion of the conversion gases or giving any value correlative to this temperature. The expression "correlative value" should be taken to mean any physical value varying with the rate of flow of gas issuing from the converter, the temperature value mentioned above accordingly being given only by way of example.

The essential feature of the method of the invention is that during the refining operation, one records, as a function of time, a graph indicating over the whole or a portion of the sound spectrum the intensity of the sound resulting from the refining operation, as well as a graph indicating the temperature of the gaseous products resulting from the combustion of the refining gases, or any value correlative to this temperature, and one then adjusts the refining conditions in such a way that these two graphs follow predetermined paths.

The adjustment in the refining conditions may be made by modifying the rate of flow of oxygen from the lance, the height of the lance, the geometric and dynamic characteristics of the jet of oxygen, the supply of powdered lime through the refining lance, or several of these parameters.

The method can be carried out in several embodiments. The first of these embodiments is based on the observations that the graph showing the intensity of sound coming from the refining apparatus has several regions in its general makeup. In FIG. 1, region I corresponds to the period of progressive formation of slag and of dissolution of the lime that has been added; region II begins at the moment when all the slag becomes reactive; and region III corresponds to varying levels of iron, in slag the various curves 1, 2, 3 corresponding respectively to a slag whose iron content is increasing.

Figure 2:
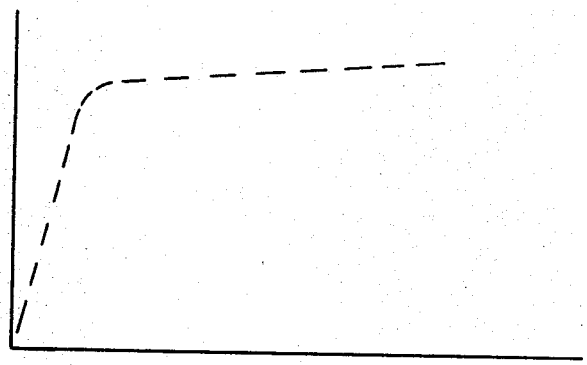

The continuous measurement of the temperature of the said combustion products moreover leads to the construction of a graph shown generally in FIG. 2. The said graph is explained as follows:

At the beginning of the refining operation the rate of decarbonisation, i.e, of combustion of the carbon by the oxygen—which gives a mixture CO and $CO_2$ in the converter—increases with time until the time approximately when the slag begins to become reactive. At this moment it is desirable to keep the decarbonisation rate substantially constant. If this rate decreases, the oxygen blown in will react to a greater extent with the iron, and will increasingly oxidize it, so that the content of iron oxide in slag will increase. On the other hand, if the rate of carbonisation increases, the excess oxygen in the slag will also contribute to decarbonisation by supplementing the oxygen blown in. As a result, the slag is deoxidised and becomes inactive. As the rates of flow of CO and of $CO_2$ issuing from the converter vary with the decarbonisation speed, the products of combustion of the latter, at constant decarbonisation speed, will have an almost constant temperature.

The value of this decarbonisation rate and accordingly the temperature of the gaseous products as well as the moment it is attained can be predetermined experimentally as a function of certain rates of decarbonisation of the iron and of oxidisation of the slag.

Based on these observations, the first variation of the method of the invention consists essentially, bearing in mind the composition of the pig to be refined, in fixing a required iron content for the slag and adjusting the refining conditions so that the temperature of the combustion products follows a predetermined curve. This is done by approximately at the moment when the temperature of the said products has become substantially constant, modifying the flow rate of refining oxygen in such a way that the graph giving the sound intensity issuing from the refining apparatus is lowered until it reaches a value which corresponds to the selected iron content for the slag while the temperature graph is kept approximately horizontal; and maintaining these refining conditions substantially constant until the refining operation has been completed.

In accordance with another preferred embodiment of the invention, the rate of flow of refining oxygen is kept substantially constant and the other refining conditions are regulated in such a way as to cause a constant rate of increase in the temperature of the gaseous products until the required level is reached, and once it has been, these conditions are further regulated in such a way as to maintain this level and to obtain a level of sound corresponding to the iron content initially selected for the slag. It should be noted that in this case the speed of temperature increase can be regulated as a function of the desired iron content in the slag.

In both the embodiments mentioned above once the period of adjustment has been completed, the blowing-in conditions are regulated and are maintained so as to keep the values indicated by the two graphs substantially constant. The end of the refining operation is marked by sharp and considerable variations in the two graphs.

In actual practice, it is possible to use at one and the same time all or a part of the characteristics of the two embodiments indicated above.

In accordance with a third preferred embodiment, the adjustment of the refining conditions is automatically controlled by the values of the above-mentioned parameters recorded in the two graphs in such a way as to follow two predetermined lines on these graphs.

The invention will be further described by reference to the following example:

The following relationships are experimentally determined:

(1) the relationship between the brilliance of the flame or the temperature of the gases issuing from the converter, and the decarbonisation rate, $dC/dt$ of the bath;
(2) the relationship between the sound intensity level N of the noise coming from the interior of the converter and the oxidisation state of the slag (FIG. 1 of the description); and
(3) the relationships between:

the variation of height of the lance H, with the variation in the decarbonisation rate, $dC/dt$,
the rate of flow of oxygen with the decarbonisation rate,
the variation of the rate of flow of oxygen with the variation of the sound intensity level, N on the converter,
and in general the influence of refining conditions on $dC/dt$ and on N, as shown by the temperature of the conversion gases.

The initial refining conditions are determined in accordance with a known standard method, and specify the height of the lance H as well as the rate of flow of $O_2$ to be observed. For example, for a 180 metric ton converter, the initial height of the lance is 2.20 m. and the rate of flow of oxygen, 450 Nm.³/min.

The method of the invention consists in adjusting the refining conditions (height of the lance, rate of flow of $O_2$) in such a way that during the entire refining process a desired value $$\left(\frac{dC}{dt}\right)_c$$

is maintained for the decarbonisation speed $dC/dt$ and a desired value $N_c$ for the sound level N, these two values normally being liable to variation with time.

Figure 3:
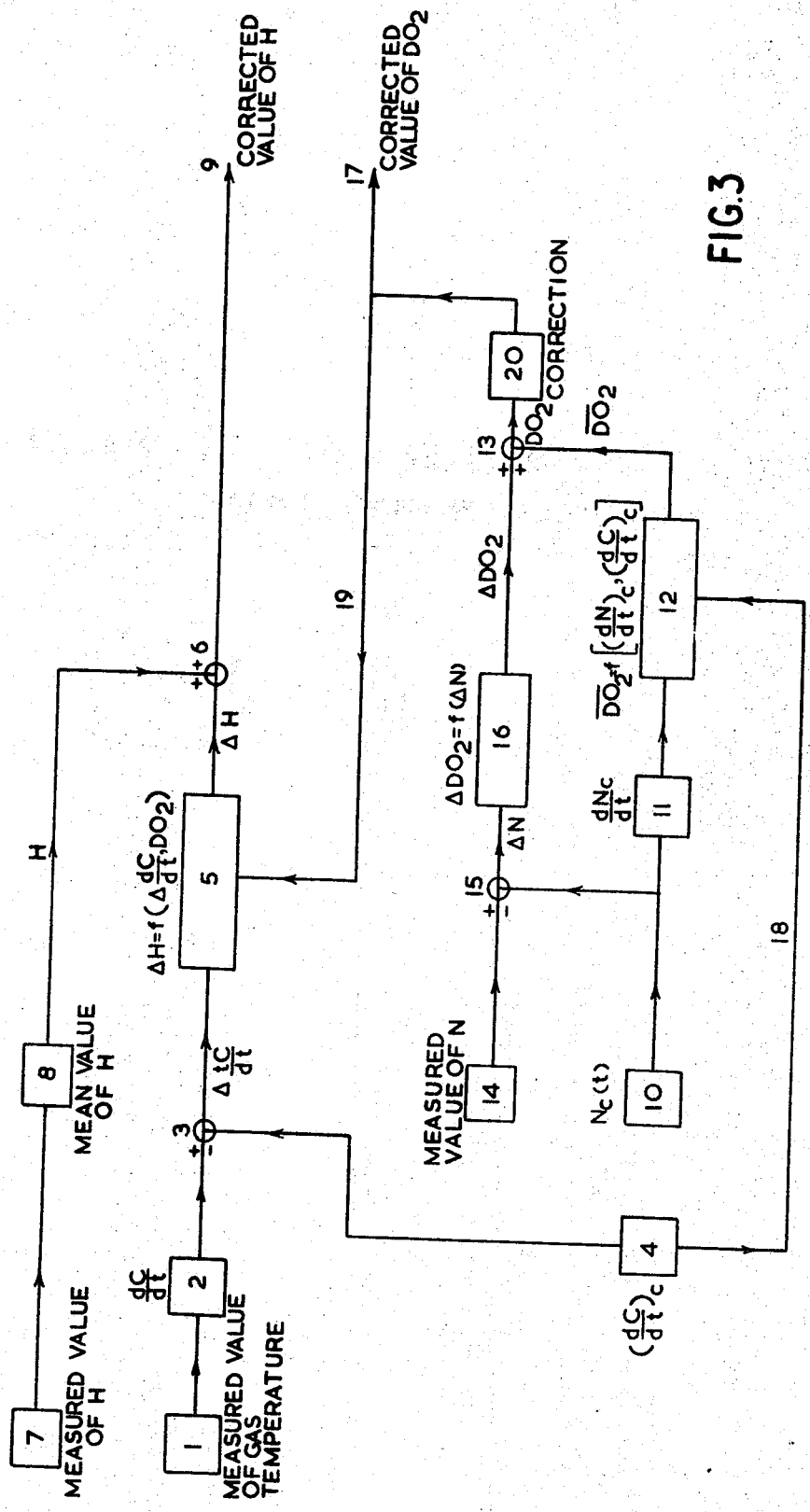

In practice, the method of the invention can be put into effect as follows (see FIG. 3):

By known means continuous measurement of the temperature of the flames 1 is carried out. This temperature value is converted into a corresponding value of decarbonisation speed $$\frac{dC}{dt}$$

2, which is compared at 3 to a desired value $$\left(\frac{dC}{dt}\right)_c$$

4. The difference $$\Delta\frac{dC}{dt}$$

existing between 2 and 4 is brought to zero, for instance by modifying the height of the lance H adequately by a value ΔH. This value ΔH is determined at 5 by means of the experimentally-determined relationships existing between any variation ΔH of H and any variation $$\Delta\frac{dC}{dt}$$

of the decarbonisation rate, the said relation being symbolised by $$\Delta H = f\left(\Delta\frac{dC}{dt}\right)$$

The value of ΔH thus calculated at 5 is added at 6 to the value of H, measured at 7 and adjusted to its mean value at 8, which supplies at 9 the continuously corrected value Hc to which height the lance is adjusted. A servo motor (not shown) adjusts the lance to this value Hc continuously, in a way known per se.

It is also known that the desired sound intensity value $N_c$ to be aimed at varies with time in accordance with a determined relationship, i.e.

$$\left(\frac{dN_c}{dt}\right)$$

11 which represents the instantaneous variation of $N_c$.

To adapt the rate of flow of oxygen to the variations in the desired value, one makes use of the known relationship between the oxygen flow rate and $N_c$, symbolised at 12 in the form $$DO_2 = f\left(\frac{dN_c}{dt}\right)$$

The corrected rate of flow $DO_2$ is added at 13 to the correction $\Delta DO_2$ derived from the difference between the actual level N measured at 14 and the desired value $N_c$ 10, the said difference being measured in the comparator 15. The correction $\Delta DO_2$ is calculated at 16 by means of the experimentally-determined relationship between $\Delta DO_2$ and $\Delta N$, this relationship being symbolised by $\Delta DO_2 = f(\Delta N)$. The addition carried out at 13 supplies at 17 the corrected value $DO_2$ to be aimed at.

The block diagram described above is completed by two links embodying the known influence of the variation of the rate of flow of oxygen on the value of the decarbonisation speed.

The first of these links 18 is obtained by the introduction in the relation $$DO_2 = f\left(\frac{dN_c}{dt}\right)$$

of a correction term reflecting the influence of the value of $$\left(\frac{dC}{dt}\right)_c$$

on the the parameter $DO_2$. The modified relation 12 will accordingly be written as follows:

$$DO_2 = f\left[\left(\frac{dN}{dt}\right)_c, \left(\frac{dC}{dt}\right)_c\right]$$

Note that $$\left(\frac{dN}{dt}\right)_c = \frac{dN_c}{dt}$$

The second link 19 permits the introduction in the calculation of ΔH of the known influence which a modification of $DO_2$ causes in the decarbonisation speed. The relation 5 can accordingly be symbolically written as follows:

$$\Delta H = f\left(\Delta\frac{dC}{dt}, DO_2\right)$$

In order to give the whole measuring and control apparatus sufficient operating stability, the device 20 making it possible to obtain the value $DO_2$ 17 at the outlet of 13 introduces corrections $\Delta DO_2$ substantially more slowly than does the device 6 for making the necessary corrections at H, thus avoiding unnecessary oscillations of the value $\Delta H$ due to the influence of $DO_2$ on $$\Delta \frac{dC}{dt}$$

It should be noted here that the height of the lance and oxygen flow rate cannot effectively vary except within certain limits, fixed by experience. In the example considered, H remains between 2.2 m. and 1.25 m., $DO_2$ remains between 400 and 550 Nm.$^3$/min.

The predetermined experimental relationships referred to above must be determined for each converter using all the data relevant to conditions of operation in that converter.

Various modifications may be made within the scope of the invention as defined in the following claims.

We claim:
1. In the method of refining pig iron by blowing oxygen-containing gas into a converter containing pig iron, the improvement in combination therewith, which comprises a method of controlling the said refining operation by:
   (a) recording, with time over at least a part of the sound spectrum, the variation of intensity of sound in the converter,
   (b) recording, with time, the variation of the temperature of the gaseous products of combustion of the refining gases, or any parameter correlative with this temperature, including the quantity of vapour produced in a waste heat boiler in an intake hood for the gaseous products, the quantity of atomised water needed to cool the gaseous products collected in the hood, and the speed of an acoustic wave passed through the gaseous products, and
   (c) adjusting the refining condition in such a manner that the variations recorded follow predetermined paths.

2. A method as claimed in claim 1, in which when the temperature of the combustion products becomes substantially constant, the rate of flow of refining oxygen is modified so that the intensity of sound is lowered until it reaches a predetermined value, related to the iron content of the slag, and the temperature of the combustion products and the intensity of the sound are kept substantially constant until the refining operation is completed.

3. A method as claimed in claim 1, in which the rate of flow of refining oxygen is kept substantially constant and the other refining conditions are regulated so as to give a constant rate of increase in temperature of the combustion gases to a predetermined level and then maintaining constant this temperature level and a predetermined sound level corresponding to a desired iron content of the slag.

4. A method as claimed in claim 1 in which the refining conditions are automatically controlled so as to cause the temperature/time and sound/time graphs to follow separate predetermined curves.

References Cited

UNITED STATES PATENTS

| | | | |
|---|---|---|---|
| 2,807,537 | 9/1957 | Murphy | 75—60 |
| 3,161,499 | 12/1964 | Percy | 75—60 |
| 3,181,343 | 5/1965 | Fillon | 73—23 |
| 3,329,495 | 7/1967 | Ohta et al. | 75—60 |
| 3,372,023 | 3/1968 | Krainer et al. | 75—60 |
| 3,377,158 | 4/1968 | Meyer et al. | 75—60 |

FOREIGN PATENTS 1,422,726  1/1965  France.

L. DEWAYNE RUTLEDGE, Primary Examiner

G. K. WHITE, Assistant Examiner